United States Patent

[11] 3,563,359

[72] Inventors Ernst J. Hunkeler
Fairport;
Ralph E. Klubertanz, Rochester, N.Y.
[21] Appl. No. 812,287
[22] Filed Apr. 1, 1969
[45] Patented Feb. 16, 1971
[73] Assignee The Gleason Works
Rochester, N.Y.
a corporation of New York

[54] AUTOMATIC WORKPIECE TRANSFER AND STORAGE MECHANISM
9 Claims, 10 Drawing Figs.

[52] U.S. Cl. ..................................................... 198/19;
198/103
[51] Int. Cl. ..................................................... B23p 23/04,
B23q 5/22
[50] Field of Search .......................................... 198/19, 26,
24, 103, 214/(Inquired); 29/33.12 (Inquired)

[56] References Cited
UNITED STATES PATENTS
3,323,630   6/1967   Fowler .......................... 198/19

Primary Examiner—Edward A. Sroka
Attorney—Morton A. Polster

ABSTRACT: A transfer mechanism for delivering and receiving pinion workpieces to and from a pair of double-station bevel gear cutting machines in timed relation to their operation. The mechanism also includes storage bank means in which partially-processed workpieces may be accumulated, thereby permitting the double-roughing machine to continue operation when the double-finishing machine must be temporarily shutdown for cutter replacement, daily maintenance, etc., and similarly providing a continuing supply of workpieces to the double-finishing machine when the double-roughing machine is temporarily shutdown.

Patented Feb. 16, 1971

INVENTORS
ERNST J. HUNKELER
RALPH E. KLUBERTANZ
BY
Morton A. Polster
ATTORNEY 3,563,359

AUTOMATIC WORKPIECE TRANSFER AND STORAGE MECHANISM

This invention relates to automated bevel gear cutting machinery and, more particularly, to mechanism for automatically conveying workpieces to and from machinery for roughing and finish cutting the teeth in bevel and hypoid pinions, particularly of the automotive axle type.

Copending patent application, "Improvements in Bevel Gear Making," Ser. No. 764,212, filed Oct. 1, 1968, describes a pair of so-called "double cradle" machines or "double work-cutting station" machines, one of the pair being a two-station rougher, and the second being a two-station finisher. The primary function of this pair of double-station machines is to completely finish a pinion gear from a solid blank in four separate and successive cutting operations. The above patent application, and the other applications noted therein by reference and filed on even date therewith, describe fully automatic mechanisms relating to such double-station machines which pick up workpieces from a conveyor, load work-cutting stations, rough or finish cut, transfer workpieces between the two work-cutting stations, and unload processed workpieces to a conveyor. In order to provide finished gears from blanks in a fully automatic operation, in addition to the machines and loading mechanisms just referred to above, it is necessary to have apparatus for moving workpieces to the double-roughing machine and for transferring workpieces from the double-roughing machine to the double-finishing machine. Preferably, such apparatus also provides for continuous operation of either machine of the pair in the event of temporary shutdown of the other machine for replacement of cutters, daily maintenance, etc.

The principle object of this invention is to provide such a transfer apparatus, such that no manual handling of workpieces is required between the two double machines other than to bring blanks to the storage-type entrance chute of the roughing machine and to remove completely finish-cut parts from the storage-type exit ramp of the finishing machine.

A further object of this invention is to provide as a part of the transfer apparatus, a storage bank, whereby a supply of roughed parts is available to permit continuing operation of the double-station finisher in event of shutdown of the roughing machine, and whereby storage facility is available to permit continuing operation of the rougher in the event of similar finisher shutdown, full normal operation of the four-station cutting operation being resumed thereafter simply by restarting the serviced machine, the delay occasioning no stopping of the other double machine nor manual handling of workpieces between machines before, during, or after the temporary stoppage of one machine.

These objects are achieved by the invention herein which comprises a plurality of interrelated units for moving workpieces in a fully automatic manner. According to the preferred embodiment disclosed herein, a loading chute receives pinion blanks and delivers them by gravity-feed to means for loading the blanks, one at a time, onto an initial-processing conveyor which moves in timed relation to the operation of the two-station rougher. The blanks move to a first station for individual pickup and delivery from a machine-loading turret mechanism which forms no part of the invention herein, being covered in a copending application, namely, U.S. Ser. No. 764,219, filed on Oct. 1, 1968.

The turret mechanism removes unprocessed blanks from the initial-processing conveyor, delivering them in sequence to the two work-cutting stations of the double rougher, and returning to the conveyor one rough cut, i.e., initially-processed pinion for each blank removed therefrom. The rough cut pinions then move along the conveyor and are transferred to the first of a pair of inclined chutes which form part of the storage bank, and the workpieces slide down to the lower end of this chute in response to gravitational forces, their speed of descent being controlled by intermittent braking means. At the bottom of the first chute, lifting means transfers the rough cut pinions to the upper end of a second inclined chute from which point they slide by gravity, again under intermittent brake control, to means which load them, one at a time, onto a final-processing conveyor. The latter conveyor moves in timed relation to the operation of the two-station finisher, the workpieces being picked up therefrom by a turret mechanism, similar to that referred to above, which delivers them sequentially to the two work stations of the double finisher and returns to the conveyor one fully-finished pinion for each rough cut pinion removed therefrom. The finished pinions then move to a discharge station where "-walking-beam" means moves them onto and along an unloading slide while maintaining a spaced relation between each successive workpiece to avoid damage thereto.

While the two conveyors move in timed relation to their respective double machines, workpieces delivered to the storage bank move continuously therethrough toward the exit station of the second chute until they contact other workpieces waiting to be loaded one at a time onto the final-processing conveyor. If the double finisher is temporarily shutdown, the final-processing conveyor also stops, and the workpieces slowly accumulate in the chutes of the storage bank as they continue to be rough cut and delivered to the storage bank by the initial-processing conveyor. Similarly, when the double rougher is temporarily shut down, rough cut workpieces from the storage bank continue to be fed onto the final-processing conveyor to supply the double finisher.

A contemplated spaced relationship of the two double machines, and the one which will be assumed in the description of this invention, is a side-by-side positioning in which the four work-cutting stations are in a generally rectangular relationship. However it will be evident that the essentials of this invention can be maintained with other spaced relationships of the machines, such as, placing the two in tandem or at right angles to one another, such placement being dependent upon the floor plan requirements of the user.

The invention will now be described in detail with reference being made to the accompanying drawings in which.

Figure 1:
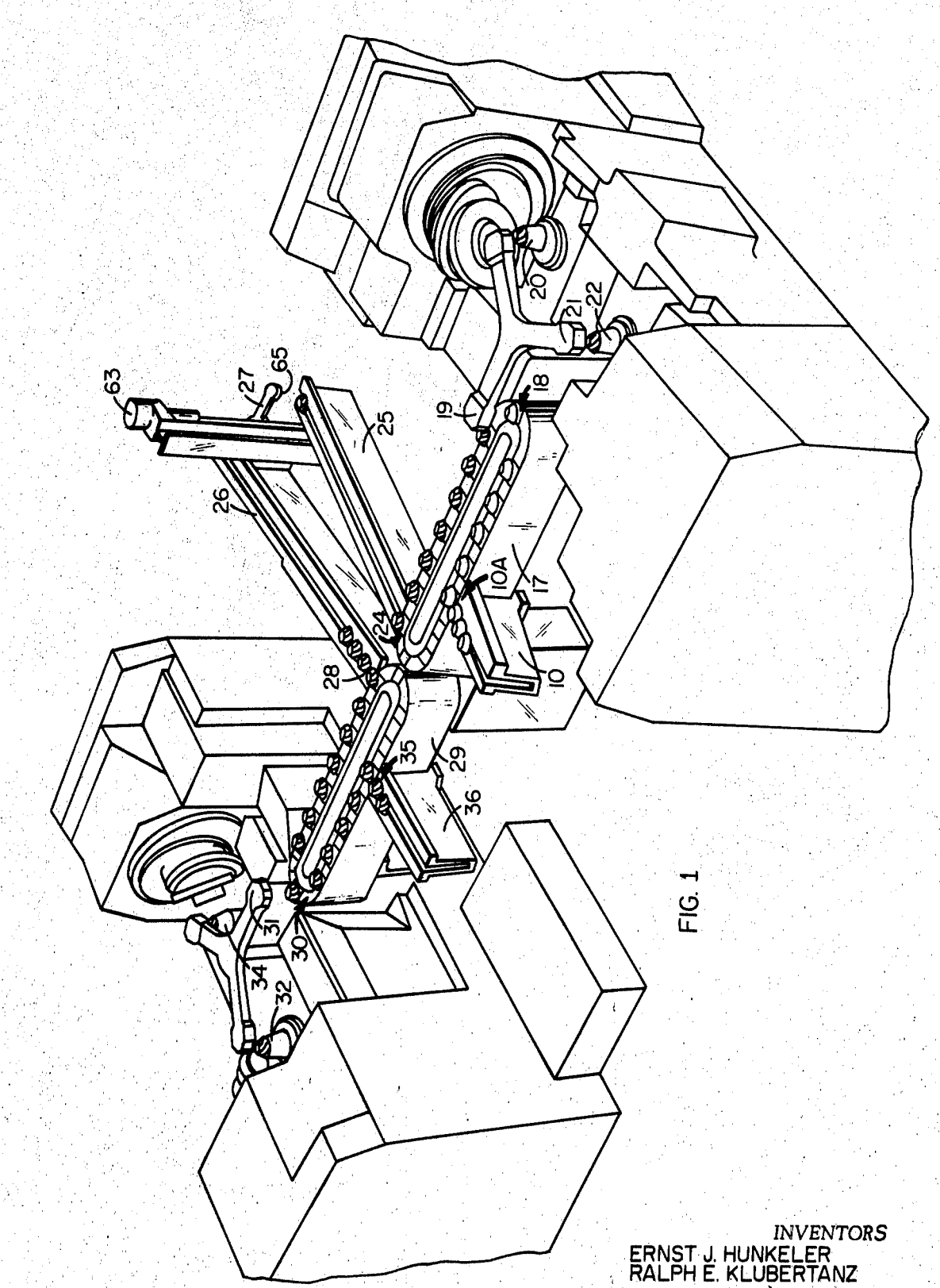
FIG. 1 is an overall isometric view of the subject transfer and storage mechanism, with certain details omitted for purposes of clarity, illustrating its relationship to a pair of double-station gear-cutting machines.

The flow of workpieces will now be followed through the illustrated embodiment of the subject invention and through the related gear-cutting machines, with reference first being made to FIG. 1. The gear-blank workpieces are initially placed in loading chute 10, either manually or by some other conveyor means not described herein and not part of this invention. For purposes of this description, workpieces are shank-type pinion blanks which slide down the initial loading chute 10 on and between rollers, or on and between plain slideways, to station 10A where a pusher mechanism (illustrated in FIG. 2 and explained in detail below) moves the blanks, one by one, out of loading chute 10 and into an endless conveyor 17 where they move in intermittent steps, in a generally counter-clockwise direction as viewed in FIG. 1, to turret load station 18 of the double roughing machine.

From station 18, the pinion blanks are withdrawn from the conveyor by lifting action of turret arm 19 and its related mechanism, rotated, and deposited in work station 20 of the double-roughing machine. During this same sequence of operation the turret mechanism moves a workpiece from work station 20 to work station 22, and turret loader arm 21 deposits an initially-processed workpiece from station 22 into the just-vacated portion of conveyor 17 still standing at load station 18.

The initially-processed workpieces are then conveyed intermittently in time with the just-described activity at station 18, by conveyor 17, to station 24 where they are pushed off, by means later to be described, onto storage bank chute 25. Workpieces exiting from conveyor 17 at station 24 slide, or move over rollers, by gravity down chute 25 of the storage bank, their rate of descent being controlled by an intermittently-operating brake mechanism shown in FIGS. 6 and 7 and described in greater detail below.

Figure 4:
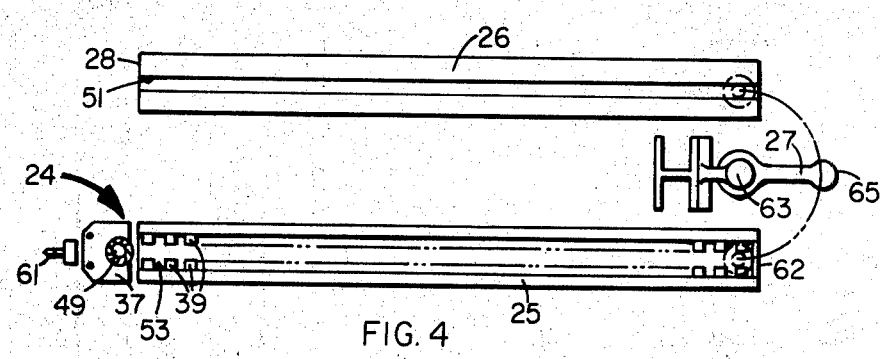
FIGS. 4 and 5 are plan and side elevation views, respectively, of the storage bank portion of the apparatus, certain parts being omitted for clarity.
Figure 5:
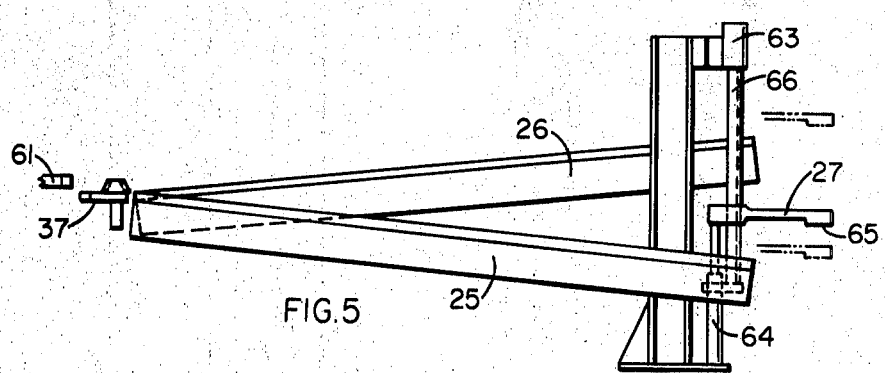

Upon reaching a stop at the lower end of storage bank 25, the workpieces are lifted, rotated and dropped onto the top of storage bank chute 26 by a transfer arm 27 shown in greater detail in FIGS. 4 and 5 and more fully described below.

The workpieces roll or slide down storage bank chute 26, their rate of descent being once again controlled by a braking mechanism not shown in FIG. 1 but shown and more fully described below in reference to FIGS. 6 and 7. At the lower end 28 of chute 26, a mechanism (similar to that employed in moving pinion blanks from initial loading chute 10 onto conveyor 17, and illustrated in FIG. 2) ejects the rough cut pinions from storage bank chute 26 into final-processing conveyor 29.

Here, as in conveyor 17, workpieces are moved in sequential steps in a counterclockwise direction (as viewed in FIG. 1), to turret load station 30 of the double-finishing machine. At station 30, a workpiece is lifted from conveyor 29 by turret arm 31 and placed in work station 32 of the double finisher. Again, during this sequence of operation the same rotary and vertical movements of the turret mechanism move a partially-finished workpiece from station 32 to station 34 and transfer a finished workpiece from station 34 to the just-vacated portion of conveyor 29 at station 30.

Finished workpieces loaded at station 30 continue to be stepped in a counterclockwise direction on conveyor 29 until they reach station 35 where they are off-loaded from conveyor 29 onto discharge slide 36. The off-loading is accomplished by a walking-beam mechanism which is not shown in FIG. 1 but is partially illustrated in FIG. 10 and more fully described below. Workpieces reaching the exit end of discharge slide 36 may be removed manually or by other conveyor apparatus not part of this invention.

It may be noted that at this point that both initial loading chute 10 and discharge slide 36 may be fitted with extensions of any convenient length as desired.

The various transfer mechanisms which were generally referred to above will now be described in greater detail by reference to FIG. 1 and to the other FIGS. of the drawings.

Figure 2:
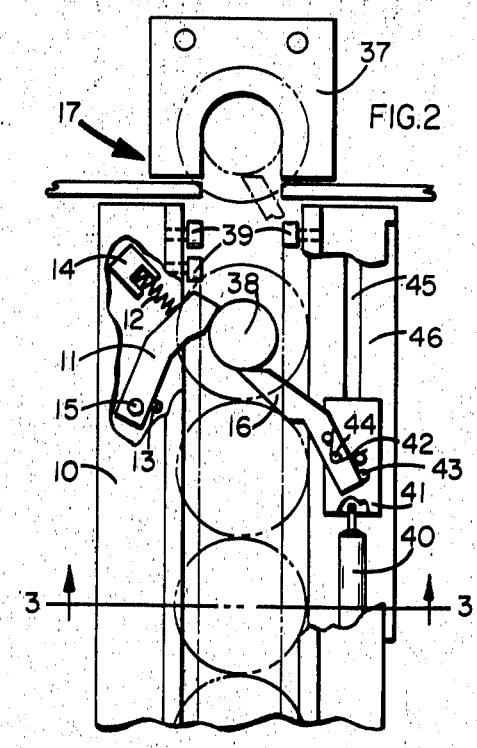
FIG. 2 is a plan view of part of the initial-loading chute of the apparatus.

Referring now to FIG. 2, as shown in phantom lines, workpieces initially loaded into chute 10 abut one another at the outside diameter of the blank heads, and their delivery into conveyor flights 37 of conveyor 17 as follows:

Pusher arm 16, rotatably attached to slide block 41 on pivot 44, is biased by spring 42 counterclockwise against pin 43 which is fixed to slide block 41. For delivery of a pinion blank, pusher arm 16 and slide block 41 are urged forward (upward as shown in FIG. 2) by hydraulic piston 40 permitting the pinion to enter through a slot in the peripheral shell of conveyor 17 and into the locating slot in a respective conveyor flight 37.

In delivering a pinion blank into conveyor 17, slide block 41 slides on shelf 46, which is fixed by means not shown to chute 10, being guided axially in groove 45 of shelf 46 by means of a tongue (not shown) on the underside thereof. To accomplish such delivery, the force exerted on pusher arm 16 by piston 40 is sufficient to overcome the bias on a blocking arm 11 which is normally held against a stop 13 by a spring 12, the latter being suitably fixed to chute 10 by a retainer 14.

As soon as a pinion blank has been delivered by pusher arm 16, arm 11 rotates back about its pivot 15 to resume its normal blocking position as shown against stop 13, the force of spring 12 being sufficient to stop the next succeeding pinion or workpiece blank as it slides into the delivery position. At this point in the operation of the pusher mechanism, arm 16 is located as indicated in dotted lines, namely, still in contact with the shank of the pinion just delivered to the slot of conveyor flight 37. Slide block 41 now resets by moving back (downward in FIG. 2) under the action of hydraulic piston 40 which is operated in timed relation to the cycling control of the rougher machine and the intermitted stepping of conveyor 17. As slide block 41 resets, arm 16 slips past the shank of the succeeding pinion 38, by rotating clockwise and overcoming the light force of spring 42.

Figure 3:
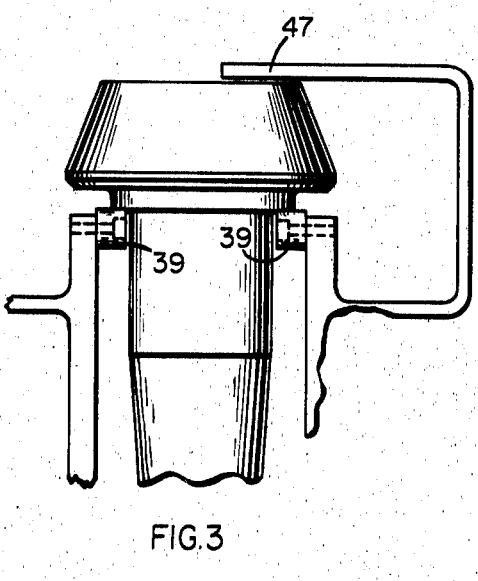
FIG. 3 is an end elevation view of the chute illustrated in FIG. 2 taken along section 3–3.

Attention is called to the fact that the slideways of initial-loading chute 10, storage bank chutes 25 and 26, and exit slide 36, are either fitted with rollers 39 (as shown in FIGS. 2 and 3 and the lower slide of FIG. 4) or plain slideways (illustrated in the upper slide of FIG. 4) depending generally upon the size and configuration of the workpieces. Also, upper flange 47 (shown only in FIG. 3 and omitted in the other drawings for clarity) serves to facilitate the rolling or sliding of the pinions down the chutes by preventing tipping and generally maintaining the upright alignment of the pinion workpieces.

Figure 8:
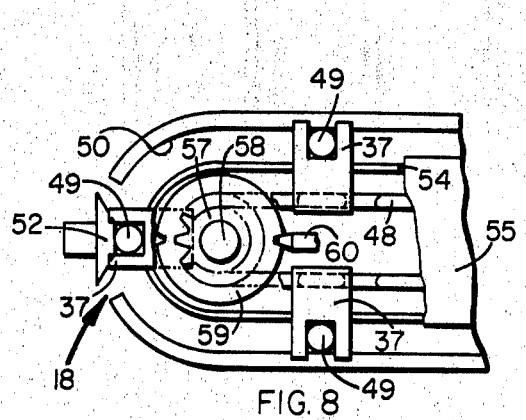
FIG. 8 is a partial plan view of one of the two continuous chain conveyors.

Reference will now be made to FIG. 8 as a plan view of initial-processing conveyor 17, and it should be understood that the remarks made here apply equally to final-processing conveyor 29. After workpieces 49 (shown only in shank dimension, the tops of the pinion blanks having been removed for clarity) are delivered from initial-loading chute 10 into respective flights 37 of initial-processing conveyor 17, workpieces 49 are intermittently advanced along with their respective flights toward turret station 18, each flight 37 being attached to an endless conveyor chain 48, and each workpiece 49 being constrained within the slot of its respective flight 37 by the inner surface 50 of the stationary outer shell of conveyor 17. Upon reaching turret load station 18, the workpieces 49 are moved into contact with an abutment 52 of the double-roughing machine which serves to position each workpiece so that it can be readily grasped by the jaws of the loader turret arm.

Figure 9:
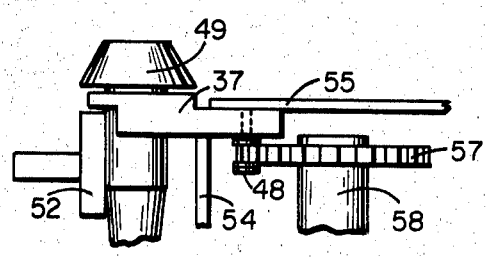
FIG. 9 is a partial section and elevation view of apparatus shown in FIG. 8.

In FIG. 9, workpiece 49 is shown at turret pickup and deposit position (station 18 in FIG. 1). At a time determined by the cutting machine control cycle, workpiece 49 is slightly elevated within flight 37 by a hydraulically actuated piston (not shown) which facilitates its pickup by the jaws of the turret arm. Also shown in FIG. 9 is a link of conveyor chain 48 suitably pin-connected to flight 37 and intermeshed with sprocket 57 which is fixed to shaft 58, the latter being rotated in 180° increments to step index the conveyor in timed relation to the operation of its associated cutting machine. As shown in FIG. 8 (but omitted in FIG. 9), a lockup plate 59, which rotates with shaft 58 and sprocket 57, has two appropriate notches, for respective engagement with a locking pawl 60 after each 180° rotation of shaft 58. Workpiece-holding flights 37 ride on a vertical wall 54 and are constrained and guided by a plate 55, these elements both being parts of the stationary structure of the conveyor.

Reference is next made to FIGS. 4 through 7 which illustrates a mechanism for transferring workpieces from initial-processing conveyor 17 into the storage bank, and for operation of the storage bank. When a workpiece 49 reaches station 24 of conveyor 17, it is pushed off its respective conveyor flight 37 by a hydraulically-actuated pusher bar 61, dropping onto storage bank chute 25 where it slides down toward a stop 62 at the lower end of the chute, its rate of descent by gravity being controlled by operation of the braking mechanism illustrated in FIGS. 6 and 7 and described below. Whenever a workpiece is in contact with stop 62, a switch (not shown) is closed to actuate a mechanism for lifting the workpiece to the top of inclined chute 26. The lifting mechanism comprises essentially an electromagnet 65 attached to arm 27 and two hydraulically-operated pistons 63 and 64 which cooperate to raise, lower and rotate arm 27 about shaft 66 when appropriately actuated by the closing of various limit switches (not shown). Electromagnet 65 is also appropriately energized (by means not shown) to pick up workpieces from the end of chute 25 and deenergized to release them when they have been properly positioned in chute 26.

Figure 6:
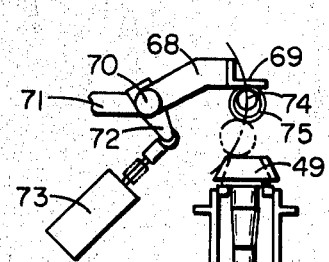
FIG. 6 is an end view of either of the chutes of the storage bank, illustrating an intermittent braking mechanism omitted from FIGS. 4 and 5.
Figure 7:
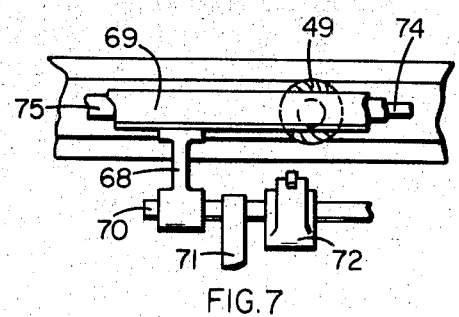
FIG. 7 is a partial plan view of the mechanism illustrated in FIG. 6.

Upon delivery to the top end of storage bank chute 26, the workpieces move on rollers, or slide on plain slideways as previously noted, under the action of gravity toward lower end 28, and as noted above, their rate of descent is controlled by the braking mechanism illustrated in FIGS. 6 and 7. This braking mechanism includes a long bar 74 which extends in the lengthwise direction over virtually the full length of the chutes. Bar 74 is supported by an angle bracket 69 which is mounted on a pair of arms 68 (only one shown) fixed to an oscillating shaft 70, the latter being supported by a pair of supports 71 (only one shown). About bar 74 is a flexible hoselike element 75 which also extends virtually the full length of the chutes. A drive element 72, also fixed to shaft 70, cooperates with hydraulic piston 73 to oscillate the entire braking structure just described above, thereby moving flexible element 75 into and out of contact with the the head of workpieces 49 and providing a braking effect on the workpieces as they move down the chutes. The action of piston 73 is under control of a timer, and, for example, this oscillation timing might be set for one second up for release and five seconds down for brake action on the workpieces. It will be appreciated that elements 71 and 73 are mounted on the stationary structure of the storage bank chutes by appropriate means not shown, and the action of the pulsating bar on both bank chutes is for the primary purpose of controlling the descent of the workpieces so that they do not forcibly strike against one another or reach the bottom of the chutes with undue speed.

Since, as previously noted, the two double-cutting machines are independently controllable, the number of workpieces in the storage bank chutes can vary from as few as one, two or three, to a full complement of workpieces in each chute. In this regard, attention is called to the fact that under fully automatic operation suitable switch devices, such as switches 51 and 53 located respectively at lower end 28 of chute 26 and at the entrance to chute 25, provide appropriate signals indicating when the storage bank is completely full or completely empty. Although such conditions are not contemplated for normal operation, in the event of an empty storage bank, the double-finishing machine is automatically stopped, and in the event of a full storage bank, the double-roughing machine is stopped.

At the lower end 28 of chute 26 (FIG. 1) there is a pusher mechanism (identical to that previously described and shown in FIG. 2 in relation to initial-loading chute 10) for ejecting workpieces from chute 26 onto conveyor 29 which transports the workpieces to and from turret station 30 and to discharge station 35 is a manner similar to that described above in relation to conveyor 17.

Figure 10:
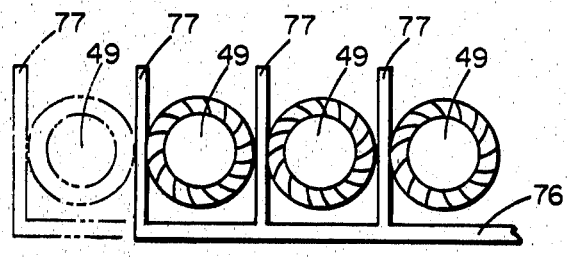
FIG. 10 is a schematic plan view of the basic walking-beam mechanism associated with the unloading slide for discharge of finished parts.

As illustrated schematically in FIg 10, a walking-beam bar 76, having fingers 77 which project between the toothed portions of each workpiece 49, delivers the completed workpieces from station 35 of final-processing conveyor 29 (FIG. 1) onto discharge slide 36. The walking beam apparatus is suitably supported by discharge slide 36, and it operates in a well-known manner, namely: bar 76 first oscillates upward until fingers 77 are high enough to clear the top of the workpiece heads. Next, there is a short translation of bar 76 (to the left in FIG. 10) for a distance sufficient to pick up a workpiece at the exit station of conveyor 29. This is followed by the lowering oscillation of bar 76, moving the fingers 77 into position between the workpieces. Finally, bar 76 is translated back to the right once again. Hydraulic means for lifting and translating bar 76 are well-known to those skilled in the art, and it will be understood that the operation of bar 76 is suitably timed to the movement of conveyor 29 and the operation of the double-finishing machine.

While the invention has been described in relation to a particular embodiment thereof, it will be appreciated that various alterations and modifications of the structure disclosed herein may be made to meet the requirements of practice without departing from the spirit and scope of the invention.

I claim:

1. Apparatus for delivering and receiving workpieces to and from first and second sets of bevel or hypoid gear processing machinery wherein said workpieces are initially processed in said first set of machinery and finally processed in said second set of machinery, said apparatus comprising:
    an intial-processing conveyor, comprising an endless flexible element moving along a fixed path past a plurality of stations and having workpiece holders evenly spaced thereby, for receiving unprocessed workpieces in said holders, moving said workpieces to a first turret station from which unprocessed workpieces are delivered to said first set of machinery, and to which initially-processed workpieces are returned, and moving said initially-processed workpieces from said first turret station to a storage-bank station;
    storage bank means comprising a loading station for receiving said initially-processed workpieces,
    an exit station,
    storage means for supporting a plurality of said workpieces and for guiding said workpieces therealong to said exit station,
    a final-processing conveyor similar to said initial-processing conveyor, for receiving initially-processed workpieces from said storage bank means, moving said workpieces to a second turret station from which initially-processed workpieces are delivered to said second set of machinery, and to which finally-processed workpieces are returned, and moving said finally-processed workpieces from said second turret station to a discharge station, and
    means for transferring said workpieces from the storage-bank station of said initial-processing conveyor to the loading station of said storage bank means, and from the exit station of said storage bank means to said final-processing conveyor.

2. Apparatus according to claim 1 wherein said initial-processing conveyor and said final-processing conveyor move said workpieces in an intermittently stepped manner in timed relation, respectively, to the operation of said first and second sets of processing machinery, and wherein said storage bank means further comprises means for continuously guiding said workpieces toward said exit station.

3. Apparatus according to claim 1 wherein said storage bank means further comprises switch means, positioned in proximity to said exit station, said switch means being responsive to the presence of workpieces at said exit station for providing a signal indicating when said storage bank is empty.

4. Apparatus according to claim 1 wherein said storage bank means further comprises switch means positioned in proximity to said loading station, said switch means being responsive to the presence of workpieces at said loading station for providing a signal indicating when said storage bank is full.

5. Apparatus according to claim 1 further comprising loading chute means for holding a plurality of unprocessed workpieces and for delivering said workpieces to said initial-processing conveyor.

6. Apparatus according to claim 1 further comprising discharge means including a slide, and walking-beam means for transferring workpieces to said slide from the discharge station of said final-processing conveyor and for moving said workpieces along said slide while maintaining a predetermined spacing therebetween.

7. Apparatus according to claim 1 wherein said storage means comprises at least first and second inclined chutes, each chute having an upper end and a lower end, said storage bank means further comprising workpiece lifting means for transferring said workpieces from the lower end of said first inclined chute to the upper end of said second inclined chute.

8. Apparatus according to claim 1 wherein said storage means comprises at least one inclined chute, said workpieces moving therealong in response to gravitational forces, and wherein said apparatus further comprises braking means for slowing movement of said workpieces along said inclined chute.

9. Apparatus according to claim 8 wherein said braking means comprises a brake element movable from a first position out of contact with said workpieces to a second position in substantial contact with the workpieces, said element being intermittently moved between said first and second positions.